(No Model.)
C. T. MASON, Jr.
COTTON PICKER STEM.
No. 375,084. Patented Dec. 20, 1887.
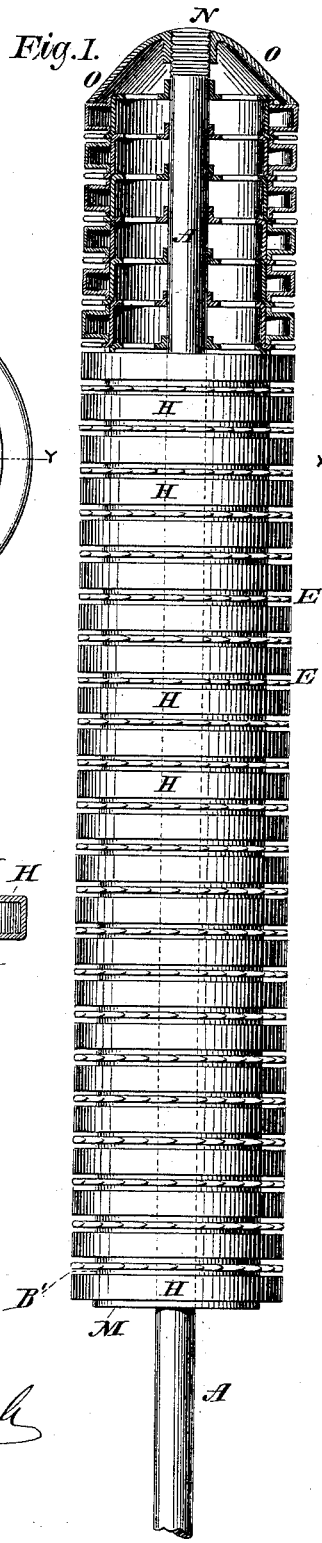
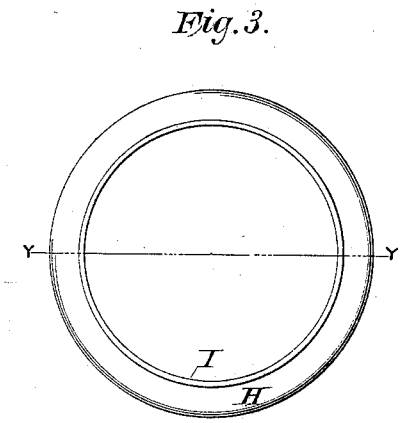
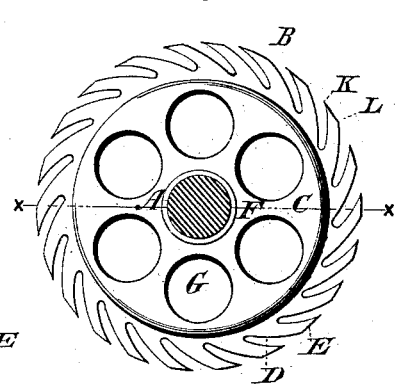
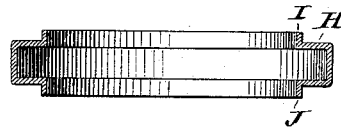
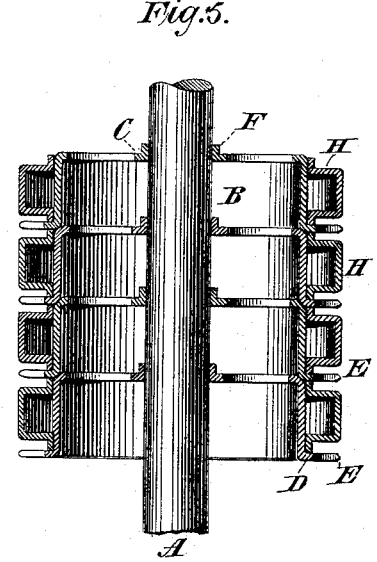
WITNESSES:
Gustave Dieterich
Wm. Goebel
INVENTOR
Charles T. Mason Jr.
BY
Park Benjamin
ATTORNEY

UNITED STATES PATENT OFFICE.

CHARLES T. MASON, JR., OF SUMTER, SOUTH CAROLINA, ASSIGNOR TO THE MASON COTTON HARVESTER COMPANY.

COTTON-PICKER STEM.

SPECIFICATION forming part of Letters Patent No. 375,084, dated December 20, 1887.

Application filed May 25, 1886. Serial No. 203,245. (No model.)

*To all whom it may concern:*

Be it known that I, CHARLES T. MASON, Jr., of Sumter, Sumter county, South Carolina, have invented a new and useful Improvement in Cotton-Picker Stems, of which the following is a specification.

My invention relates to a cotton-picking stem for gathering cotton from the bolls of the plant in the field, and is designed for use in the cotton-harvesting machines invented by me—such, for example, as the machine set forth in my patent, No. 337,007, granted March 2, 1886.

My invention consists more particularly in the construction of the stem hereinafter shown and described, whereby the said stem may be more easily and cheaply constructed and put together, and whereby the same may be made of any desired length by simply augmenting or diminishing the number of rings and toothed disks or collars of which it is composed.

In the accompanying drawings, Figure 1 represents my new stem with a portion in longitudinal section. Fig. 2 is a plan view of one of the toothed disks or collars. Fig. 3 is a plan view of one of the guard-rings. Fig. 4 is a section on the line Y Y of Fig. 3. Fig. 5 is an enlarged section of a part of the stem, said section of rings and disks being made on the line Y Y of Fig. 3 and the line X X of Fig. 2.

Similar letters of reference indicate like parts.

A is the central rod or shaft, upon which are placed the toothed disks or collars B. The disks B are of thin metal, and include a struck-up central portion, C, encircled by the flange D, in which flange are formed the teeth E.

In the flat portion of the disk or collar B is formed an opening to receive the rod or shaft A, which opening is provided with a flange, F. The flanged central aperture is made slightly smaller than the shaft A, so that the disk is secured upon said shaft tightly by being driven thereon. In the flat portion of the disk B may be made openings, as G, for the purpose of diminishing the weight of the disk. The disk or collar, with its flanges and teeth, I preferably make from a single piece of metal.

H is a guard-ring, also made from thin metal. This ring is also struck out by dies and is made hollow to reduce its weight. It has flanges I and J, and is adapted to fit snugly upon the struck-up periphery of disk B, as shown in Fig. 5.

The teeth E have their points all turned in the same direction and are made in the circumferential edge of the flange D. The points K of said teeth are on a level with the immediately-adjacent portions L of the backs of said teeth, so that the said portions L lie in a true circle. The outer peripheries of the guard-rings H are on the same level as said back portions, L, so that the points of the teeth do not project beyond said guard-rings. By this construction the elastic cotton-lint, when the stem is brought up to a boll, enters the annular space on each side of the teeth and between said teeth and the adjacent rings, and also forces itself in front of the points of said teeth. Substances which are not soft and elastic—such as leaves, stalks, &c.—cannot enter said spaces, and consequently are not engaged by the teeth. In this way the stem collects only the cotton and rejects other objects.

In assembling the parts of the stem I first place upon the rod A a disk, B', having a narrow projecting flange, M, which is not toothed. This disk is preferably soldered in position. Upon it and encircling its periphery is placed a guard-ring, H, the lower edge of which rests upon the flange M. A toothed disk, B, is then placed upon the shaft A and in contact with the disk, B', already applied, and on this disk is adjusted another guard-ring, H. In this way the stem is built up until the screw-threaded end N of the rod A is reached. To this end a correspondingly-threaded hollow metal cap, O, is applied and turned down to clamp all the disks firmly together, so that all parts of the structure thus become rigidly connected. The upper surface of the cap O is rounded, as shown. In operation this stem is rotated on its own axis, points of the teeth forward, in order to gather the cotton.

I do not broadly claim herein a picker-stem for cotton harvesters composed of a series of independent washers or rings fitted on a spindle and forming circular guards, and a series of circular lines of picker-teeth alternating with said guards, inasmuch as I have already fully claimed such construction in Letters Patent No. 286,032, granted to me October 2, 1883. Neither do I claim herein specifically a series of independent hollow washers or rings fitted on a spindle and forming circular guards and a series of circular lines of picker-teeth alternating with said guards.

I claim—

1. In a cotton-picker stem, a central shaft, and supported thereon a collar or disk having a struck-up central portion, C, and a projecting flange with circumferential picking-teeth on said flange, substantially as described.

2. In a cotton-picker stem, a central shaft, a series of disks or collars having struck-up central portions and projecting flanges, with circumferential picking-teeth supported in contact with one another upon said shaft, and guard-rings encircling and supported upon said disks or collars and alternating with said toothed flanges, substantially as described.

3. In a cotton-picker stem, a collar or disk, B, having a struck-up central portion, C, and a flange, D, provided with teeth E, the said disk and flange being formed integrally of thin metal and supported on said shaft, and a guard-ring, H, also of thin metal, supported on said collar or disk, substantially as described.

4. In a cotton-picker stem, a central shaft, and supported thereon a series of disks, B, having flanges D, with circumferential picking-teeth E, and a clamping device for holding said disks in contact upon said shaft, substantially as described.

5. In a cotton-picker stem, a central shaft, A, having a threaded extremity, N, a series of disks or collars, B, having flanges D, with circumferential picking-teeth E, supported on said shaft, guard-rings H, supported on and encircling said disks B, and a screw-cap, O, adapted to said threaded extremity, substantially as described.

6. In a cotton-picker stem, the central shaft, A, disks or collars B, having toothed flanges D, lower disk or collar, B', having the narrow flange M, guard-rings H, and screw-cap O, substantially as described.

CHAS. T. MASON, JR.

Witnesses:
F. J. JENEY,
E. M. ANDERSON.